March 20, 1956

E. J. BUCZKOWSKI ET AL 2,738,713

METHOD AND APPARATUS FOR MAKING DECORATED
ASBESTOS-CEMENT SHEET MATERIAL

Filed Sept. 18, 1952

INVENTORS
Edward J. Buczkowski
Stanley J. Ostrowski
Harvey R. Anderson
BY
Synnestvedt & Lechner
ATTORNEYS March 20, 1956

E. J. BUCZKOWSKI ET AL 2,738,713

METHOD AND APPARATUS FOR MAKING DECORATED
ASBESTOS-CEMENT SHEET MATERIAL

Filed Sept. 18, 1952

INVENTORS
Edward J. Buczkowski
Stanley J. Ostrowski
Harry R. Anderson
BY
Synnestvedt & Lechner
ATTORNEYS

United States Patent Office 2,738,713
Patented Mar. 20, 1956

2,738,713

METHOD AND APPARATUS FOR MAKING DECORATED ASBESTOS-CEMENT SHEET MATERIAL

Edward J. Buczkowski, Ambler, Stanley J. Ostrowski, Philadelphia, and Harvey R. Anderson, Eureka, Pa., assignors to Keasbey & Mattison, Ambler, Pa., a corporation of Pennsylvania Application September 18, 1952, Serial No. 310,332

13 Claims. (Cl. 92—40)

This invention relates to the manufacture of decorated asbestos-cement sheet material, for example in the form of shingles, siding units or the like.

The invention is particularly concerned with improvements applicable to the decoration of asbestos-cement sheet materials made on the so-called Hatschek type of machine. This type of equipment includes an accumulator roll or bowl onto which successive laminations of moist asbestos-cement are transferred from a carrier band or belt. In making sheet material on such a machine, a multiplicity of laminations are built up on the accumulator roll, and after accumulation to the desired thickness, the sheet material is slit axially of the roll and removed therefrom, following which the sheet may be cut to pieces of desired size, for instance to a size appropriate for shingles or siding units.

The invention is also especially concerned with the employment, as the decorative material, of particulate material or granules such as the various known types of roofing granules.

Certain techniques have already been worked out to effect decoration of the kind of asbestos-cement sheet material above referred to with the kind of particulate material also referred to. However, the prior techniques have been subject to a number of disadvantages and limitations, and the principal object of the present invention is to provide improved apparatus and an improved method for applying decorative material to asbestos-cement sheets.

More specifically, it is an object of the invention to improve the adherence of the particulate material to the decorated surface of the asbestos-cement sheet, thereby improving the weathering life of the product.

A further object of the invention is to facilitate the application of decorative granules in accordance with textured patterns. This is accomplished according to the invention while maintaining improved adherence of the particles, even in areas of a textured pattern, where the particles are liberally applied.

A still further object of the invention is to improve the uniformity of the decorative effect throughout the entire area of the decorated surface of the sheet.

How the foregoing and other objects and advantages are attained will appear more fully from the following descriptions referred to in the accompanying drawings, in which—

Figure 1:
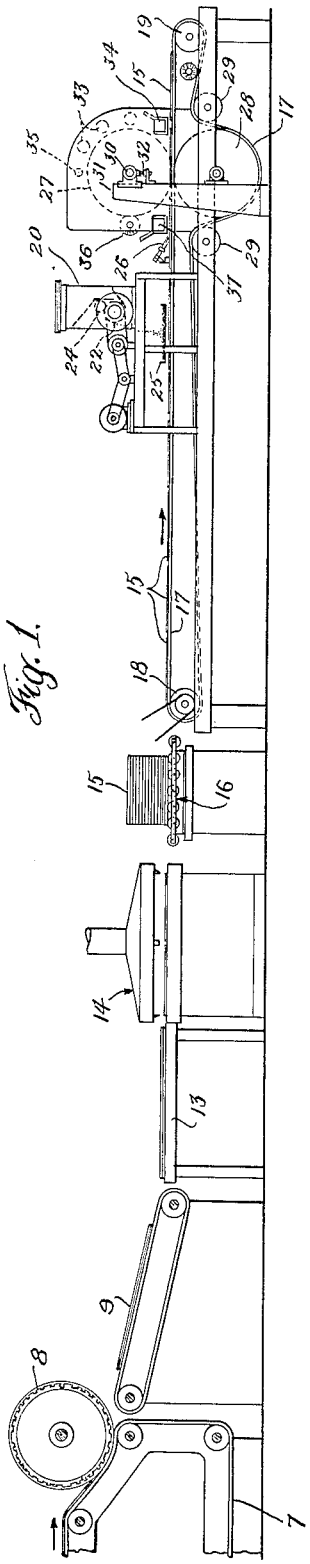
Figure 1 is a somewhat diagrammatic side elevational view of equipment constructed according to the present invention and including an improved accumulator roll adapted for use in a Hatschek type of machine used to form the sheet material to be decorated.

Toward the left in Figure 1, the carrier band or belt of a Hatschek type machine is indicated at 7. An asbestos-cement slurry is fed to this band in known manner and the resulting film or web is transferred from the band to the accumulator roll, a plurality of layers or laminations being built up on the accumulator roll until the desired thickness of moist asbestos-cement is laid thereon. At that time, the laminated sheet on the roll is slit axially of the roll and is removed therefrom onto a support, preferably folded to double thickness as indicated at 9. This general operation of accumulating successive laminations on the roll and removal thereof to a support is well understood in the art.

Figure 2:
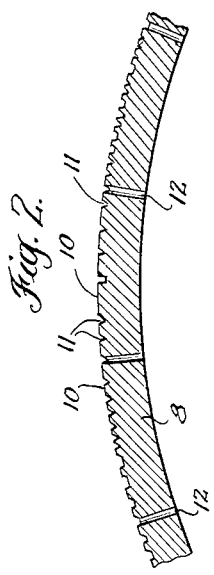
Figures 2 and 3 are enlarged fragmentary transverse and longitudinal sectional views through a portion of the accumulator roll shown in Figure 1.
Figure 3:
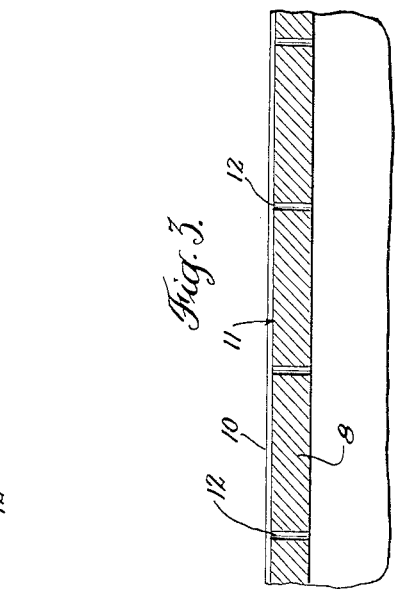

According to one feature of the invention, an accumulator roll of novel structure is used. Thus, the accumulating surface of the roll is textured to provide lands and valleys according to a desired pattern, a typical example being a pattern formed by cutting grooves in the surface of the roll, and extended axially thereof, the grooves being circumferentially spaced from each other according to a random spacing. As seen in Figs. 2 and 3, this provides lands 10 between grooves or valleys 11. With this arrangement, when the successive laminations are built up on the accumulator roll, a complementary textured surface is formed on the laminated sheet, the purposes and effect of which will be described more fully hereinafter. It is here further pointed out that the wall of the cylinder is also provided with a multiplicity of vent passages such as indicated at 12, which serve an important function during the process of laying up the successive laminations on the roll. We have found that a textured roll of the kind above described tends to reduce the entrapment of air pockets under the sheet being built up on the roll. Such air pockets are vented and dissipated by the employment of vents indicated at 12. These vents desirably communicate with the base of the grooves or valleys of the textured surface, as is clearly shown in Figures 2 and 3.

In a typical textured roll according to the invention, the grooves may be of the order of 1/32" in depth and the vents are spaced both axially and circumferentially of the roll on centers about 4" apart.

The textured sheets 9 may be stacked up on a table 13 and then transferred in groups to a cutter 14, which may be used to subdivide the initially formed sheets into appropriate sheets for shingles or siding unit formation, such as are indicated in a stack at 15. The stack 15 is shown in Figure 1 as supported upon a conveyor 16 which is only diagrammatically indicated, it being understood that the conveyor may be of any desired length and arrangement providing for transfer of the cut sheets to the mechanism for applying the decorative particulate material. This latter portion of the mechanism appears toward the right in Figure 1 and is described just below with particular reference to Figures 1 and 4.

An endless conveyor belt 17 is arranged to travel in a circuit established in part between end rolls 18 and 19. The cut sheets are placed upon this conveyor 17 with the textured surface thereof presented upwardly. In the case of a texture of the kind specifically illustrated herein, comprising parallel lands and valleys, the sheets are placed on the conveyor belt 17 with the lands and valleys running cross-wise of the belt, for reasons which will appear.

Above the belt in the mid-region thereof, a mechanism is provided for depositing the decorative particulate material on the textured surfaces of the sheets carried by the belt. This mechanism comprises a hopper 20 for a supply of the particulate material. Toward the bottom of the hopper, a slot-like opening 21 serves to deliver the decorative material to a feed roll 22 having axial grooves 23 formed therein to provide pockets for receiving individual charges of the granules for subsequent delivery downwardly to the sheets traveling on the conveyor. A wiper or doctor roll 24 may be used to remove excess material from the feed roll 22.

Figure 4:
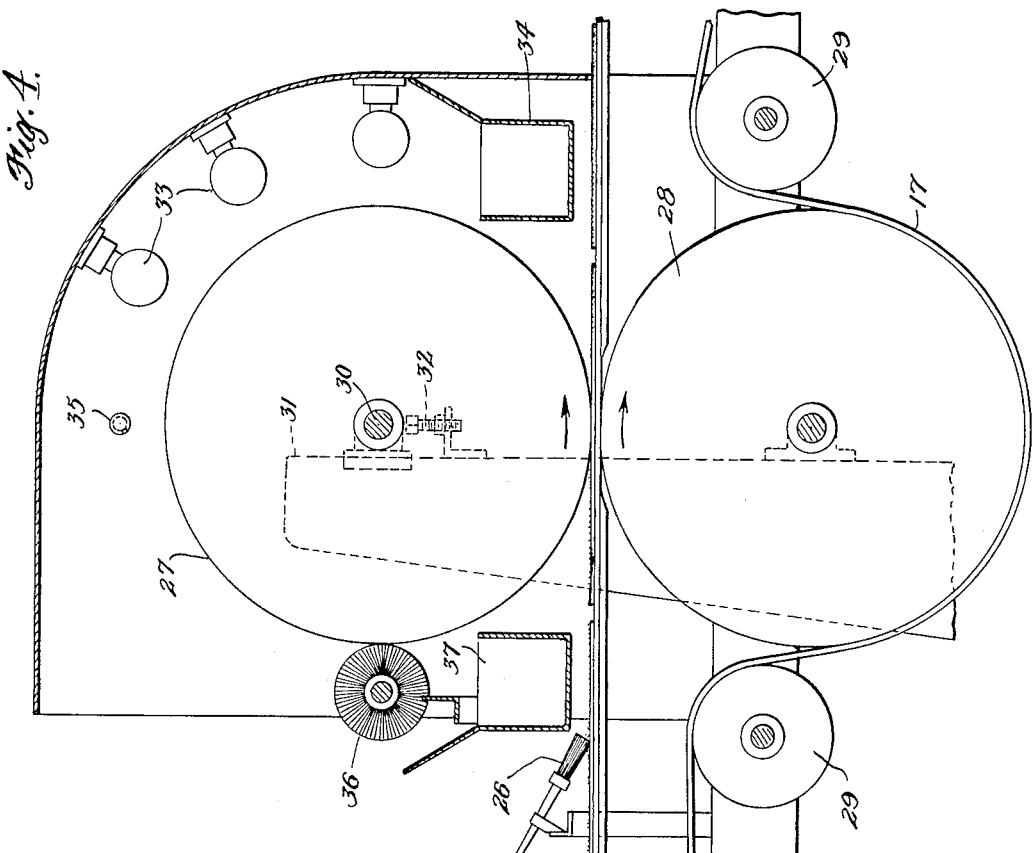
Figure 4 is an enlarged elevational view, with certain parts in vertical section, more particularly illustrating portions of the equipment shown in Figure 1 for applying the granular decorative material to the asbestos-cement sheets.
Figure 5:
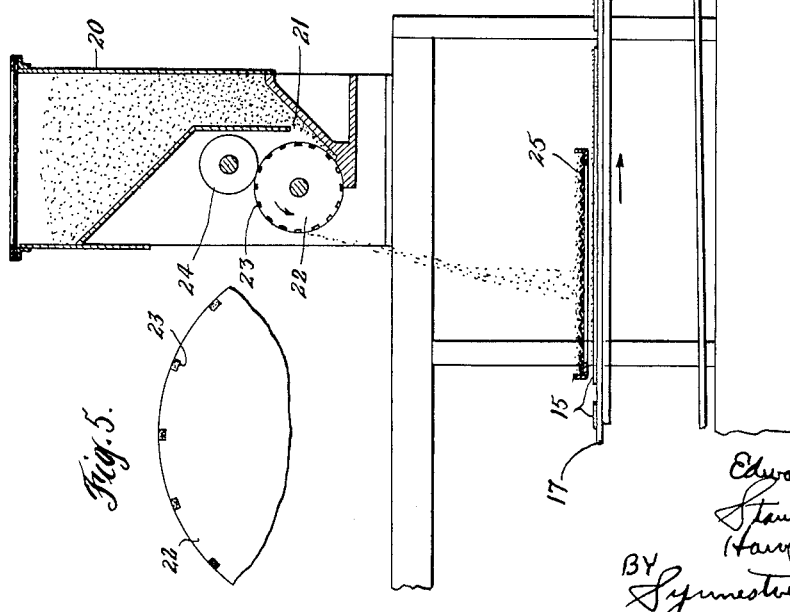
Figure 5 is an enlarged fragmentary view of a portion of one part of the decorative granule feeding mechanism.

As the feed roll 23 rotates in the direction indicated by the arrow in Figure 4, the granules of the decorative material drop downwardly therefrom by gravity to and through the screen 25 which is preferably located just above the level of the sheets 15 being carried on the conveyor. The mesh of the screen 23 is advantageously slightly larger than the particle size of the decorative granules. Thus, in a typical case, where the granules are of about 26 mesh in size, the screen openings should be about 16 mesh.

The screen just described aids in effecting uniform broadcast distribution of the granules over the textured surface of the sheets 15 as they pass under the screen. In addition, the screen acts to break the fall of a large proportion of the particles, thereby resulting in dropping of the material upon the sheets at relatively low velocity. In consequence of this the particles have virtually no tendency to bounce, and this is of special importance in the region of the marginal edges of the sheets in which the bouncing of appreciable quantities of the particles would result in loss of particles beyond the edges of the sheets, and thus in a decrease in the concentration in the edge regions. With this feature in mind, it is of advantage to place the screen at an elevation only slightly above the sheets as they pass therebelow.

As the sheets are carried beyond the screen 25, they pass under a wiping or brushing device serving to wipe or brush granules of the decorative material from the lands of the textured surface of the sheets into the valleys thereof. This device appropriately takes the form of a bristled brush 26 arranged to wipe the sheets substantially throughout the width thereof, as they are carried by on the conveyor 17.

Beyond the brushing device 26 the belt, with the sheets thereon, passes between a pair of pressure rolls 27—28 which act to embed the granules of the decorative material in the asbestos-cement sheets. These rolls are desirably of smooth external surface, so that they serve not only to embed the particles but also to substantially flatten the texture of the sheet.

The lower roll 28 is adapted to be driven by engagement with a pass of the belt 17 around the lower portion of the roll, as defined by the idler rolls 29—29. The pressure engagement of the sheets between the two rolls may be provided merely by virtue of the weight of the upper roll 27 for which purpose the shaft 30 of the upper roll is mounted in bearing blocks arranged for vertical movement on standards 31 at the ends of the rolls. Adjustable stop devices, such as indicated at 32, are desirably located at opposite ends of the mounting shaft 30, these devices being adjusted so as to prevent downward movement of the roll 27 to the surface of the conveyor belt 17 at points between the successive sheets 15 carried by the belt. The purpose of placing limitation upon the downward movement of the roll 27 is to avoid a tendency to excessively flatten or taper off the leading and the trailing edges of the sheets carried by the belt. In this way substantial uniformity of thickness of the sheets is provided.

In connection with the operation of the rolls 27—28, it should be kept in mind that the asbestos-cement sheets carried by the belt 17 are still in their moist condition, in view of which the rolls 27—28 will pick up moisture from the sheets. This would tend to cause particles to adhere to the roll 27, and if such particles were to be carried on the surface of the roll through a complete revolution they would again be brought in contact with following sheets and be deposited thereon. Thereby the pattern or texture effect would be impaired. The equipment therefore provides means for drying the surface of the drum 27. One expedient for this purpose comprises the use of heating lamps 33. As the surface of the drum and the particles carried thereby are dried, the particles will drop off into a collector trough 34. Removal of the particles and drying of the drum may further be effected by air jets from an air supply pipe 35. A rotary brush 36 may also be provided to remove granules adhering to the drum, this brush being located to deliver particles brushed from the drum into another collector trough 37.

After the decorated sheets have passed through the pressure rolls 27—28, they are taken away and dried and cured. This may be done in any of a number of known ways, including arrangement of the sheets in a stack with flat metal plates therebetween and placement of such a stack in a hydraulic press to remove some of the moisture therefrom. Autoclaving may also be employed. When the sheets are set or cured they may be trimmed, punched to provide nail holes, or otherwise finished so as to put them in final form for sale or use.

Figure 6:
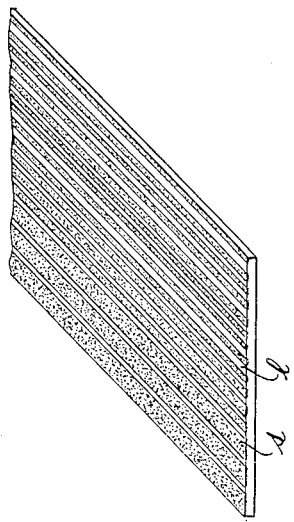
Figure 6 is a fragmentary isometric view of a portion of a decorated sheet produced according to the invention.

A portion of a completed sheet is illustrated somewhat conventionally in Figure 6. Here it will be seen that the decorated surface of the sheet comprises random width strips $s$ in which the decorative granules are present in relatively high concentration, and intervening random width strips $l$ having very few, if any, of the decorative granules. When using decorative granules of a color shade contrasting with the color of the asbestos-cement sheet material itself, a textured decorative effect is attained somewhat resembling, in a conventionalized manner, the graining of wood, for instance the types of wood employed in making wood shingles. It will be understood that other types of texture patterns may be produced in accordance with the practice of the method above described, in all cases the pattern being delineated by virtue of greater and lesser concentration of the decorative particles in different areas of the sheet.

It is mentioned that the method and equipment of the invention make possible more sharply contrasting texture or pattern effects than has been practicable heretofore, because of the application of the decorative granules to the sheet material subsequent to preparation of such sheet material in a form having a physical textured surface, the valleys of such surface being more or less filled with the granules by the method of application thereof, including the wiping or brushing action, which follows the broadcast dispersion of the granules.

Moreover, when operating according to the present invention, decorative texture or pattern effects are provided on sheet material of this kind while providing much greater weathering life. The increased weathering life, as compared with prior known decorating techniques, results in large part from the fact that the laminated sheet is initially formed upon an accumulator roll having a textured accumulating surface. Because of this, all portions of the sheet, even the portions in the valleys of the textured surface thereof have substantially the same density, i. e., all portions are still relatively moist and therefore relatively soft, so that when pressure is applied to the decorated surface, the granules are readily embedded in the asbestos-cement material of which the sheet is formed. This is in distinct contrast with and represents a substantial improvement over the prior known technique where sheets are textured after removal from the accumulator roll, since in this prior type of operation the texturing results in compression of the sheet material in the valleys, in consequence of which the particles are not readily embedded therein and exhibit a marked tendency to separation and loss upon weathering.

The textured side of the sheet may also be veneered in known manner, in various colors, as desired. This technique per se is known in the operation of machines of the Hatschek type, and according to such operation, a surface lamination or veneer containing, for example, a white or light colored pigment, will first be applied to the accumulator roll, after which the remaining laminations will be built up from the standard asbestos-cement mix. Thereafter granules of contrasting colors may be applied, and in this way very pleasing effects are achieved, for instance the effect of green or brown granules applied over a white veneer on the textured side of the sheet.

We claim:

1. A method for making decorated asbestos-cement sheet material, comprising accumulating successive laminations of moist asbestos-cement on a textured accumulator surface to provide a laminated sheet having a complementarily textured surface, while the sheet is moist applying decorative particulate material to the textured surface of the sheet with a greater concentration of the particles in the valleys of the textured surface than on the lands thereof, while the sheet is moist bringing the decorated surface of the sheet in contact with a smooth surfaced pressure applying member to substantially flatten the textured surface and embed the particles in the sheet, and thereafter curing the decorated sheet.

2. A method for making decorated asbestos-cement sheet material, comprising accumulating successive laminations of moist asbestos-cement on a textured accumulator surface to provide a laminated sheet having a complementarily textured surface, while the sheet is moist applying decorative particulate material to the textured surface of the sheet with a greater concentration of the particles in the valleys of the textured surface than on the lands thereof, while the sheet is moist applying pressure thereto to embed the particles in the sheet, and thereafter curing the decorated sheet.

3. A method according to claim 2 in which the decorative particulate material is scattered broadcast with substantially uniform distribution over the textured surface of the sheet and is thereafter brushed from the lands of the textured surface into the valleys thereof to effect greater concentration of the particles in the valleys than on the lands.

4. A method for making decorated asbestos-cement sheet material, comprising accumulating successive laminations of moist asbestos-cement on an accumulator surface to provide a moist laminated sheet, while the sheet is moist applying decorative particulate material to a surface of the sheet by dropping the particles under the influence of gravity through a screen close to the surface of the sheet to break the fall of at least a substantial proportion of the particles, while the sheet is moist applying pressure thereto to embed the particles in the sheet and thereafter curing the decorated sheet.

5. A method for making asbestos-cement sheet material, comprising accumulating successive laminations of moist asbestos-cement on an accumulator roll having a textured surface with lands and valleys, and during the accumulation of the successive laminations, venting the interspace between the laminations and the roll at a multiplicity of points located in the valleys of the textured surface of the roll.

6. In equipment for making decorated asbestos-cement sheet material from sheet blanks comprising moist laminated asbestos-cement having a surface provided with lands and valleys, mechanism for distributing decorative particulate material broadcast over said surface, mechanism for wiping particles from the lands of said surface into the valleys thereof to provide for increase in the concentration of the particles in the valleys, as compared with the lands, and means for applying pressure to said surface to thereby embed the particles therein.

7. In equipment for making decorated asbestos-cement sheet material, a conveyer adapted to receive and advance moist laminated asbestos-cement sheet material having lands and valleys on the surface thereof to be decorated, a feeder for decorative particulate material located along the feeding path of said conveyer and providing for broadcast delivery of particles to the surface to be decorated, brush mechanism located along said feed path beyond the feeder to provide for wiping of particles from the lands of the sheet material into the valleys thereof, and a pressure roll located along the feed path beyond the brush mechanism engaging the surface of the sheet material being decorated to provide for embedding of the particles of the decorative material in the surface of the sheet material.

8. Apparatus according to claim 7 in which the pressure roll is a smooth-surfaced pressure roll to provide not only for embedding of the particles in the sheet material but also for flattening of the surface thereof.

9. In equipment for making decorated asbestos-cement sheet material, a conveyer adapted to receive and advance moist asbestos-cement sheet material to be decorated, a feeder for decorative particulate material located along the feed path of said conveyer and providing for delivery of particles to the surface to be decorated, a pressure roll located along the feed path beyond the point of delivery of decorative particles for embedding the particles in the surface of the sheet material, and mechanism for drying the surface of the pressure roll and for removing particles therefrom during rotation of the roll.

10. An improved accumulator roll for use in making asbestos cement sheet material, comprising a roll with an external accumulating surface provided with a multiplicity of long but narrow grooves arranged generally parallel to each other to simulate graining and having a multiplicity of vent ports communicating with the grooves at spaced points, said roll providing for the production of grained textured blanks of substantially uniform density.

11. Apparatus for making decorated asbestos-cement sheet material comprising an accumulator roll having a textured accumulator surface adapted to receive successive laminations of moist asbestos-cement, to provide for the formation of laminated sheets having a complementarily textured surface and in which the land and valley portions of the sheets have substantially the same density, means for stripping the laminated sheets from the roll, a conveyor for advancing the laminated sheets successively in a feed path, mechanism located along said feed path for distributing decorative particulate material over the textured surface of the sheets during advancement of said conveyor, and wiping means providing a greater concentration of the particles in the valleys of the textured surface than on the lands thereof, and pressure applying mechanism comprising cooperating members having opposed pressure applying surfaces adapted to receive the sheets therebetween and operating to apply pressure to the opposite sides of the sheets to compress the sheets and thereby flattening the lands and embedding the particles in the sheets.

12. Apparatus according to claim 11 in which the mechanism for distributing the decorative particulate material includes a feeder for dropping charges of particles onto the surface of the sheet, and a screen in the path of the particles between the feeder and the sheet and in which said screen is located sufficiently close to the surface of the sheet to effect uniform broadcast distribution of the granules over the surface of the sheets.

13. Apparatus according to claim 11 in which the opposed pressure applying surfaces of the pressure applying mechanism are smooth.

References Cited in the file of this patent

UNITED STATES PATENTS

| | | |
|---|---|---|
| 1,426,497 | Outman | Aug. 22, 1922 |
| 1,793,688 | Gardella | Feb. 24, 1931 |
| 1,844,404 | Ledeboer | Feb. 9, 1932 |
| 2,013,332 | Anderson | Sept. 3, 1935 |
| 2,043,545 | Kirschbraun | June 9, 1936 |
| 2,184,619 | Leonard | Dec. 26, 1939 |
| 2,233,122 | Burns | Feb. 25, 1941 |
| 2,531,016 | Waechter | Nov. 21, 1950 |

FOREIGN PATENTS

| | | |
|---|---|---|
| 469,075 | Canada | Oct. 31, 1950 |